Dec. 8, 1970  J. T. MESSER, JR  3,545,311
DEBURRING TOOL
Filed Aug. 12, 1968
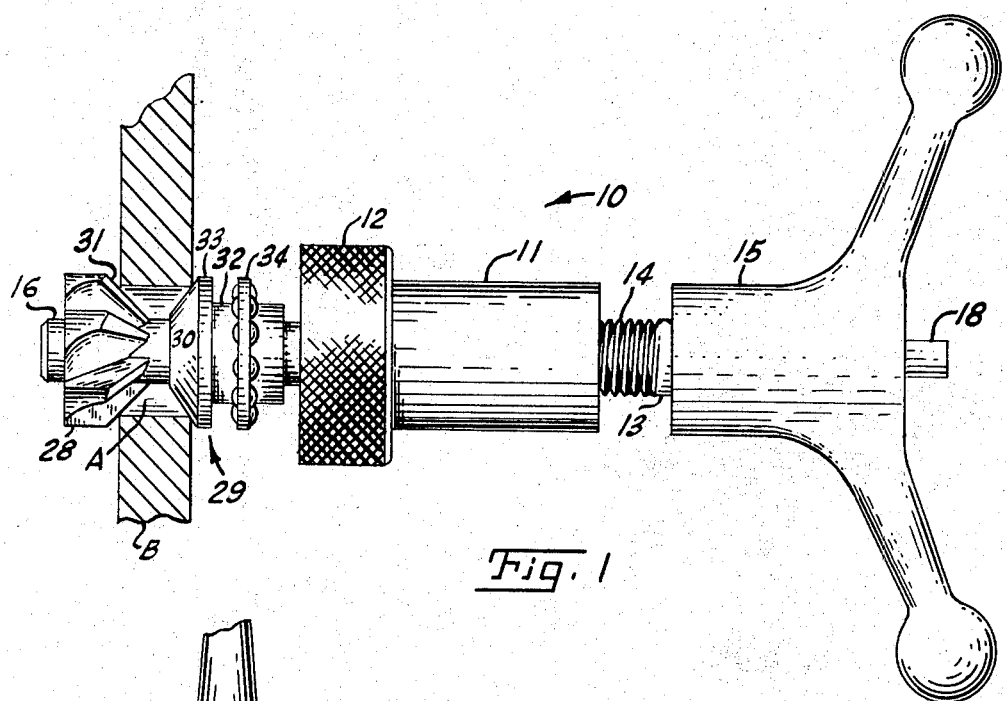
Fig. 1
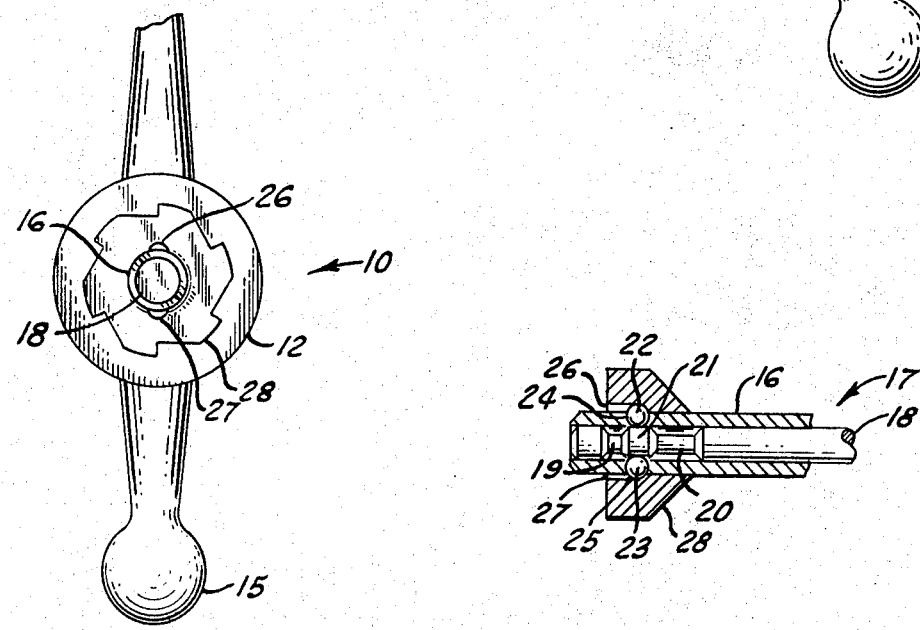
Fig. 2
Fig. 3
James T. Messer Jr. INVENTOR.
BY
ATTORNEY 3,545,311
DEBURRING TOOL
James T. Messer, Jr., Huntsville, Ala., assignor to Thiokol Chemical Corporation, Bristol, Pa., a corporation of Delaware
Filed Aug. 12, 1968, Ser. No. 751,819
Int. Cl. B23b 51/16
U.S. Cl. 77—73.5          3 Claims

ABSTRACT OF THE DISCLOSURE

A tool for deburring the rough edge of a drilled hole on the reverse or rear face of a piece of material through which the hole has been drilled.

BACKGROUND OF THE INVENTION

Field of the invention

During the fabrication of many articles, it is often necessary to deburr the rough edges about a drilled hole in a piece of material on both faces thereof. There are many types of tools that will deburr the hole on the front face of the material through which the hole has been drilled, but there are few that will deburr the rough edges of the hole on the reverse or rear face of the material.

The tool embodying the instant invention is so assembled that it can quickly and efficiently deburr the rough edges of a hole on the reverse or rear face of a piece of material without undue effort on the part of the operator.

Description of the prior art

Deburring of the rough edges of a drilled hole in the front face of a piece of material is old and well known. Many deburring bits are in use today that may be hand operated or machine operated, but no hand tool is known that will use a deburring bit so that the reverse or rear face of a piece of material can be reached so that the rough edges of a drilled hole can be effectively and efficiently removed by an operator.

SUMMARY OF THE INVENTION

This invention relates to improvements in hand operated deburring tools that can deburr the rough edges from a drilled hole in inaccessible places such as the reverse or rear face of a piece of material in which the hole has been drilled.

It is often necessary in precision work to be positive that all of the rough edges are removed from both of the rims of a hole that has been drilled in a piece of material. In missiles and spacecraft, any unevenness about a drilled hole may result in failure of the missile or spacecraft and it has been found necessary, therefore, to remove any excess material that might occur at both of the rims of a hole drilled in a piece of material that is to be used in the construction and assembly of such missiles and spacecraft.

Many types of tools may have been tried, but none were available to meet the requirement of deburring a drilled hole or the reverse or rear face of a piece of material.

The tool is simple and efficient and by the use of a left-hand thread in the assembly thereof, permits an operator to manipulate by a right-hand motion the deburring tool embodying the invention in a highly efficient manner.

It is an object of the invention, therefore, to provide a hand operated deburring tool which can be easily and efficiently manipulated by an operator to deburr the rough edges from a drilled hole on the reverse or rear face of a piece of material.

With the above and other objects and advantages in view that may appear as the description of the invention proceeds, it will be noted that the invention consists of the novel details of construction and arrangements of parts that will be more fully illustrated in the accompanying drawing in which:

BRIEF DESCRIPTION OF THE DRAWING

FIG. 1 is an elevational view, showing the operation of the deburring tool embodying the invention on a piece of material shown in cross section in which a hole has been drilled;

FIG. 2 is an end view, partly broken away, of the deburring tool of FIG. 1; and

FIG. 3 is a fragmentary detailed sectional view of the quick release mechanism of the tool of FIG. 1.

DESCRIPTION OF THE PREFERRED EMBODIMENT

Referring more in detail to the drawing wherein like parts are designated by like reference numerals, the reference numeral 10 is used to generally designate a deburring tool embodying the invention.

The deburring tool 10 comprises a tubular hand grip 11 having an enlarged knurled segment 12 thereon and is internally threaded with a left-hand thread. A tubular shank 13, having an externally left-hand threaded portion 14, is threaded into the hand grip 11, by means of a handle 15, on the other end thereof. Extending through the shank 13 and secured at one end within the handle 15, by any well-known fastening means, is a tubular member 16 of a quick release mechanism 17 and, as shown in FIG. 3, a spring biased rod 18 also part of the quick release mechanism 17 extends though the tubular member 16.

Viewing FIG. 3, it will be noted that the outer end of the rod 18 that terminates adjacent the outer end of the tubular member 16, is provided with a pair of tapered annular grooves 19 and 20. That portion 21 of the rod 18 that is intermediate of the grooves 19 and 20 is of the same diameter as the remainder of the rod 18. When the tool 10 is in use the diametrically opposed balls 22 and 23 engage the portion 21 of the rod 18 and are extended through diametrically opposed openings 24 and 25 in the tubular member 16, so that they will protrude beyond the circumferential surface of the tubular member 16 to be received in substantially semi-circular sockets 26 and 27 in the rear face of a deburring bit 28 so that the deburring bit 28 is retained on the outer end of the tubular member 16 and will rotate with the tubular member 16 as the tubular member 16 is rotated by means of the handle 15. By pressing the end of the rod 18 that extends outwardly of the handle 15, as shown in FIG. 1, the balls 22 and 23 will move into the groove 20 so that the balls 22 and 23 will no longer protrude beyond the circumferential surface of the rod 18 and the deburring bit can be removed from fixed relation with the rod 18.

Before the deburring bit 28 is placed in operational position on the rod 18, as previously described, a centering member 29 is slipped onto the tubular member 16 and a substantially truncated conical-shaped centering face 30 that is part of the centering member 29 is positioned so that it is in opposed relation to the cutting face 31 of the deburring bit 28 and it is the centering face 30 of the deburring bit 28 that engages the rim of a drilled hole A in the front face of a piece of material B, as shown in FIG. 1.

The centering member 29 also includes a tubular ball race mounting portion 32 that is of smaller diameter than the rim 33 of the centering face 30 and a ball race 34 is mounted for rotation on the mounting portion 32.

In the operation of the tool 10, the tubular member 16 is extended through the drilled hole A from a position outwardly of the face of the piece of material B.

The handle 15 is rotated by grasping the hand grip 11 until the deburring bit 28 can be secured in place, as previously described. The handle 15 is then manipulated to the right to bring the centering face 30 of the centering member 29 into engagement with the rim of the drilled hole A in the face of the piece of material B, such action will positively insure that the cutting face 31 of the deburring bit 28 is properly centered within the rim of the hole A in the rear face of the piece of material B as it is simultaneously moved into engagement with the rim of the hole A in the rear face of the piece of material B as the centering face 30 of the centering member 29 is moved into engagement with the rim of the drilled hole A in the front face of the piece of material B. Continued rotation of the handle 15 will force the mounting portion 32 into the hand grip 11 adjacent the knurled segment 12 and the ball race 34 engaging the outer face of the hand grip 11 and the rear face of the centering face 30 will prevent any friction that would occur between these surfaces to permit free and easy rotation of these components during the operation of the tool 10.

The handle 15 is rotated until the rough edges on the rim of the drilled hole A in the rear face of the piece of material B have been removed by the cutting face 31 of the deburring bit 28.

When the edges of the drilled hole A in the rear face of the piece of material B have been completely removed, the handle 15 is then rotated to the left by grasping the hand grip 11. This action removes the cutting face 31 of the deburring bit 28 from engagement with the rim of the drilled hole A in the rear face of the piece of material B. The deburring bit 28 can then be removed from its position on the tubular member 16 by exerting pressure on the outer end of the rod 18, as previously described. The tool 10 can then be removed from the drilled hole A in the piece of material B and the deburring bit 28 can then be replaced on the tubular member 16 until it is required to again be used for deburring the rough edges from a drilled hole A in the rear face of a piece of material B.

It is believed that from the foregoing description the mode of operation and the assembly of the invention will be apparent to those skilled in the art and it is to be understood that variations in the mode of operation and assembly may be adhered to provided such variations fall within the spirit of the invention and the scope of the appended claims.

Having thus described the invention what is claimed as new and desired to be secured by Letters Patent is:

1. A deburring tool for deburring the rough edge of a drilled hole in a piece of material comprising a fixed part and a rotatable part, said parts being threadably connected to each other by means of a left-handed thread, a tubular member carried by said movable part, a quick detachable mechanism mounted within said tubular member, a centering member mounted on said tubular member and a deburring bit connected to said tubular member by said quick detachable mechanism.

2. A deburring tool as in claim 1, wherein said centering member has a substantially truncated conical-shaped centering face, a ball race mounting portion and a ball race mounted on said mounting portion to engage said fixed member to prevent friction between said centering member and said fixed member.

3. A deburring tool as in claim 1, wherein said fixed part has a knurled segment thereon and said movable part has a handle thereon and the outer end of said quick release mechanism extends through said handle for the operation thereof.

References Cited
UNITED STATES PATENTS

| | | | |
|---|---|---|---|
| 202,618 | 4/1878 | Wild | 77—73.5 |
| 1,119,528 | 12/1914 | Nieman | 77—58 |
| 2,462,147 | 2/1949 | Waller. | |

FRANCIS S. HUSAR, Primary Examiner

U.S. Cl. X.R.

145—123